J. J. FRIEND.
BEE HIVE.

No. 247,899. Patented Oct. 4, 1881.

WITNESSES
Villette Anderson
F. J. Masi

INVENTOR
Jacob J. Friend
by E. W. Anderson
his ATTORNEY

UNITED STATES PATENT OFFICE.

JACOB J. FRIEND, OF NEKOMA, ILLINOIS.

BEE-HIVE.

SPECIFICATION forming part of Letters Patent No. 247,899, dated October 4, 1881.

Application filed August 21, 1879.

*To all whom it may concern:*

Be it known that I, JACOB J. FRIEND, of Nekoma, in the county of Henry and State of Illinois, have invented a new and valuable Improvement in Bee-Hives; and I do hereby declare that the following is a full, clear, and exact description of the construction and operation of the same, reference being had to the annexed drawings, making a part of this specification, and to the letters and figures of reference marked thereon.

Figure 1:
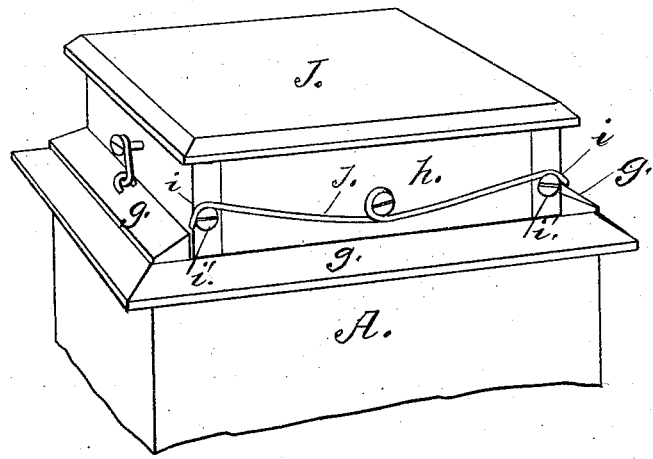
Figure 2:
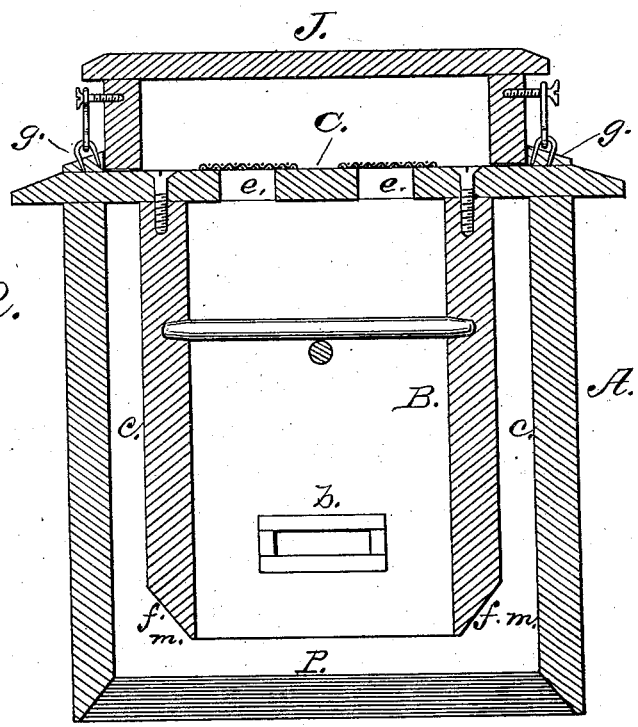
Figure 3:
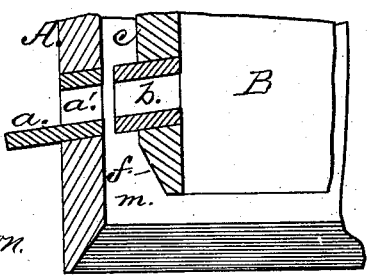

Figure 1 of the drawings is a representation of a perspective view of the upper part of the hive. Fig. 2 is a vertical central section of the hive, and Fig. 3 is a detail section thereof.

This invention has relation to improvements in bee-hives.

The object of the invention is to secure proper ventilation of the hive without illuminating the same.

The nature of the invention will be fully explained hereinafter.

In the annexed drawings, the letter A designates a rectangular wooden casing, open at top and bottom, and designed to be seated on a stand or platform, constituting its bottom. This casing is provided with a bee-perch, $a$, below a tubular bee-entrance, $a'$, coinciding with a similar entrance, $b$, leading through a wall of an inside box or hive proper, B. This hive is of less dimensions than the casing, by which means it is surrounded at its sides and ends by a dead-air space, $c$, and it may be provided with vertically-arranged wooden steps, that fill the space between it and the box A and insure a chamber of equal width at all sides thereof.

The hive proper is secured to a board, C, of rectangular form, that rests upon the upper edges of box A and closes the upper ends of the dead-air spaces $c$. This board is provided with a sufficient number of gauze-covered holes, $e$, and supports or suspends the hive proper, B, in the casing, with its lower edges clear of the stand. The lower edges of the inner or hive proper are beveled, as shown at $f$, forming at the bottom of the dead-air spaces the flaring mouths $m$, leading or opening into the same.

The entrances $b$ and $a'$ of the hive and casing are very near the bottom and not in contact with it, there being a sufficient space for the passage of the moth, so that instead of passing into the hive it passes into the space below it, and in crawling upward must follow the casing-wall and enter the dead-air space $c$, whence there is no escape.

The beveled lower end of the inner hive, B, being above the stand or platform P, and it being a habit of the moth always to ascend, it will be readily understood how rarely it can reach the honey-chamber.

The top of cap-board C has parallel guide-strips $g$, and an end strip, acting as a stop, between which is received a shallow wooden inverted box, serving as an obscurer of the hive. This box has a removable end, $h$, provided with a spring-catch, $j$, centrally secured to said end, and provided at its ends with hooks $i$, that engage buttons, knobs, or eyes $i'$ on the ends of the sides of the box J.

By disengaging the hooks from the buttons the end $h$ may be removed and the proper ventilation had without lighting up the hive.

The box J is removably secured to the cap-board by means of hook or other attachments.

What I claim as new, and desire to secure by Letters Patent, is—

The shallow inverted box J, having pins $i'$, and seated in the top of the hive, acting as an obscurer and open at one end, in combination with removable end $h$, having spring-catch $j$, having ends $i$, whereby the hive can be ventilated without lighting the hive, as set forth.

In testimony that I claim the above I have hereunto subscribed my name in the presence of two witnesses.

JACOB J. FRIEND.

Witnesses:
JNO. M. HOUGHTON,
B. W. CRANDELL.